United States Patent [19]

Angellotti

[11] Patent Number: 5,001,584
[45] Date of Patent: Mar. 19, 1991

[54] HEAD-POSITIONER ARM FOR DATA RECORDERS

[75] Inventor: Thomas J. Angellotti, Ypsilanti, Mich.

[73] Assignee: Irwin Magnetic Systems, Inc., Ann Arbor, Mich.

[21] Appl. No.: 314,376

[22] Filed: Feb. 22, 1989

[51] Int. Cl.⁵ .......................... G11B 5/55; G11B 21/08
[52] U.S. Cl. ..................................... 360/106; 360/104
[58] Field of Search ................................ 360/106, 104

[56] References Cited

U.S. PATENT DOCUMENTS

| | | | |
|---|---|---|---|
| 4,071,867 | 1/1978 | Pejcha | 360/106 |
| 4,423,446 | 12/1983 | Takahashi et al. | 360/106 |
| 4,647,994 | 3/1987 | Irwin et al. | 360/106 |

Primary Examiner—Robert S. Tupper
Attorney, Agent, or Firm—Price, Heneveld, Cooper, DeWitt & Litton

[57] ABSTRACT

A positioner mechanism for moving read-write heads in formation storage devices from one track to another across a record member, including a positioning arm which extends between the transducer and its mounting structure, disposed at one end of the arm, and a motion-imparting means (e.g., a lead screw drive) at the other end, with a pivotal arm-mounting means therebetween, whereby the motion of the arm at its end extremities is arcuate, and a calibrated lost-motion or compound-motion means connecting the arm to the transducer and/or the motion-imparting means, such that the arm moves the transducer in uniform increments along a rectilinear path notwithstanding the curvilinear motion of the arm itself. Preferably, the pivotal arm comprises an elongated, generally C-shaped member having integral pivot-axle elements extending laterally thereof at a point disposed medially along the length of the arm, and such pivot-axle means preferably comprise stub axles of semicircular cross section, the arm preferably comprising a one-piece stamped member. The lost-motion or compound-motion means associated with the arm end extremities comprises a curved surface, e.g. a recess, along which a follower or actuator moves, the curve representing an analog or development of the arcuate motion exhibited by the end of the positioning arm. In a particular preferred embodiment, such curved surface comprises a recess formed in the surface of the arm and arranged to engage the lead screw follower nut.

30 Claims, 4 Drawing Sheets

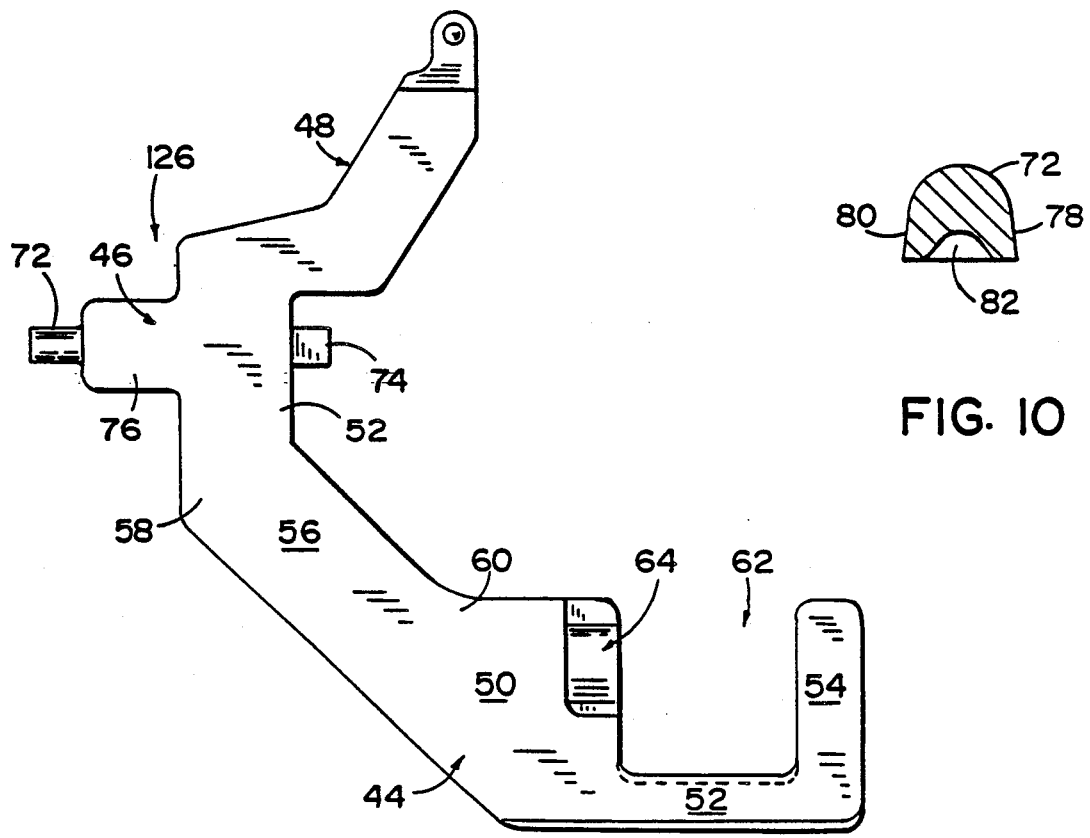
FIG. 6
FIG. 10
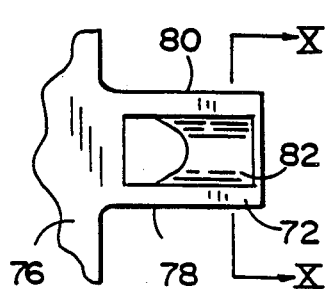
FIG. 9

HEAD-POSITIONER ARM FOR DATA RECORDERS

TECHNICAL FIELD

This invention relates to positioning systems and apparatus, particularly those used in information-storage devices, and more particularly to positioning apparatus used in computer data-storage and information-processing systems.

In a still more particular sense, the invention relates to means for positioning transducer heads in data-recording apparatus, particularly in a manner facilitating precise and consistent control, and which provides for rapid and consistent head-positioning essential to implementing a plurality of successive equally-spaced recording tracks on a record member by correcting for inherent inaccuracies found in previous such equipment.

BACKGROUND OF THE INVENTION

In multiple-track data-storage apparatus of the type in which the transducer head is stepped or otherwise moved on command to any of a series of parallel recording tracks on a record member, for example magnetic tape drives used in computer systems for data back-up and archival storage purposes, a variety of different positioning mechanisms are or may potentially be used. Most such systems employ stepper motors, which are very accurately controllable since they produce a particular and specific amount of output shaft rotation as a function of the number of excitation pulses applied, and such pulse actuation lends itself to very accurate control.

Where the physical arrangement and environment permits, the stepper motors in such head-positioning systems are typically located in an area directly adjacent the place where the transducer head is to be located in order to access the recording media, since it is desirable to move the transducer head directly from the output shaft of the stepper motor because this allows for very accurate and consistent head-positioning. Where the architecture (physical arrangement of parts) for the drive is more confined, however, as is frequently the case in present-day miniaturized streaming cartridge-type magnetic tape drives, far more exacting conditions of physical confinement exist since the amount of available space is extremely limited; thus, the head-positioning motor must sometimes be located at a considerable distance from the location of the head itself. In such situations, an elongated linkage of one type or another must be utilized to translate motion from the head-positioning motor to the head, which is normally mounted in or on some head-carrier having a guide system which ensures the necessary accuracy in lateral movement of the head across the recording media. Use of such elongated motion-transfer apparatus inevitably tends to introduce error in the resulting positioning of the head, due to a number of reasons.

One successful previous system for use in such applications is shown in U.S. Pat. No. 4,647,994, which is commonly owned with the present patent (and which should be considered incorporated by reference herein). In that system, a miniaturized cartridge-type tape drive is shown which lends itself to implementation in a very small physical volume and yet which provides for accurate positioning of the transducer head at a plurality of locations with respect to the recording media (i.e., tape). In this system, the head-positioning motor is actually located in the rearward-most extremity of the tape drive, due to the extremely demanding physical constraints presented by the very limited packaging envelope, and due to the fact that direct drive of the tape-transporting capstan is considered desirable, and is achieved, by placement of the capstan-drive motor in the only location which is available close to the point where the transducer head must of necessity be located. Accordingly, in the system shown in such prior patent, a pivotal arm system is utilized to translate motion from a rotary cam driven by the head-positioning motor forward through the frame and other componentry of the drive and up to the point where the head is located. Such a system does in fact work well under many conditions, and has been successfully used for a number of years in commercially successful data-storage tape drives which utilize a number of comparatively narrow, closely-spaced recording tracks (for example, eight to twelve different tracks extending parallel to one another across the width of recording tape, which is nominally one-quarter inch wide).

Under circumstances encountered at the present point in time, however, track densities far more demanding than those just noted are becoming required, to increase the available storage capacity on the media (tape). Thus, one may now contemplate the use of many more such tracks on the same width of tape, each of which is narrower than those utilized in the past and far more closely spaced to adjacent tracks. Consequently, a pivotal head-positioning arm such as that shown in U.S. Pat. No. 4,647,994 ultimately reaches its maximum performance limit, since while the stepper motor which initiates changes in head position may be accurately controlled, and while mechanisms are available by which the carefully-controlled stepper motor shaft rotation may be consistently and accurately outputted to the positioning system, it is inevitably true that such a pivotal arm will not in fact move the head exactly the same distance for each step or group of steps initiated by the positioning motor, inasmuch as the ends of the pivotal arm move on a radius over an arcuate path. Thus, depending upon the particular dimensions of the pivotal arm and the relative position of its pivot axis with respect to that of the head and recording media, a given increment of pivot arm rotation will produce a different and varying amount of ensuing head movement at each different position which the arm may occupy during its operation. This produces track spacing variations which, while unimportant under prior state-of-the-art conditions, becomes extremely important where it is desired to use substantially the entire width of the media with very closely-spaced adjacent tracks, without wasting any available space on the media; of course, the problem becomes even more exacerbated where the recording tracks are extremely narrow, as is true of the present state-of-the-art.

BRIEF SUMMARY OF THE INVENTION

Accordingly, the need exists for further refinements of systems such as that referred to above, as typified by U.S. Pat. No. 4,647,994, and that is the goal as well as the achievement of the present invention. Therefore, the present invention provides an improvement for head-positioning systems used in data-storage applications, of the type referred to previously, wherein the inherent positioning variations resulting from the arcuate movement exhibited by the ends of a pivotal positioning arm are fully compensated for in an automatic and consistent manner, enabling a high degree of accuracy in the placement of numerous closely-adjacent narrow recording tracks on the recording media.

Generally speaking, these objectives and advantages are accomplished by a novel and highly effective coupling between the motor-driven head-positioning apparatus (i.e., stepper motor and output cam, or lead screw and follower system), constituting in effect a structural analog (or, more accurately, an anti-log) of the head-positioning motion otherwise produced at the transducer-positioning end of the pivot arm. As a result, such variations in track spacing are in effect neutralized, and are substantially eliminated, whereby the same basic system (i.e., pivot arm-type positioning system) may continue to be utilized but with vastly improved results.

As a further objective and advantage of the invention, a specifically different form of head-positioning pivot arm is provided having distinctly desirable advantages, together with structural features and characteristics which lend themselves to improved overall functioning of the system by virtue of using a lead screw and follower mechanism rather than rotary ramp cam, thereby providing greater accuracies and greater control flexibility for the system.

Accordingly, the invention also provides, in addition to the advantages and objectives noted above, a new and novel form of pivot arm, having a generally elongated C-shaped configuration, and embodying a comparatively short pivot axle disposed medially of the arm, which lends itself to particularly desirable manufacturing capabilities and yet provides highly consistent and stable operation. Further, the novel form of head-positioning pivot arm in accordance herewith provides for more rapid and yet more accurate manufacturing while at the same time providing a higher modulus of stiffness, such that flexure of the arm and resulting energy storage therein during operation is substantially eliminated, notwithstanding the comparatively simplified structure involved.

BRIEF DESCRIPTION OF THE DRAWINGS

FIG. 6 is an overhead plan view of the novel positioning arm in accordance herewith;

FIG. 9 is an enlarged, fragmentary bottom plan view of a portion of the structure shown in FIG. 7, as seen from the plane IX—IX thereof;

FIG. 10 is an enlarged, sectional side elevational view showing part of the structure seen in FIGS. 7 and 8, taken along the plane X—X of FIG. 8.

DESCRIPTION OF PREFERRED EMBODIMENTS

Figure 1:
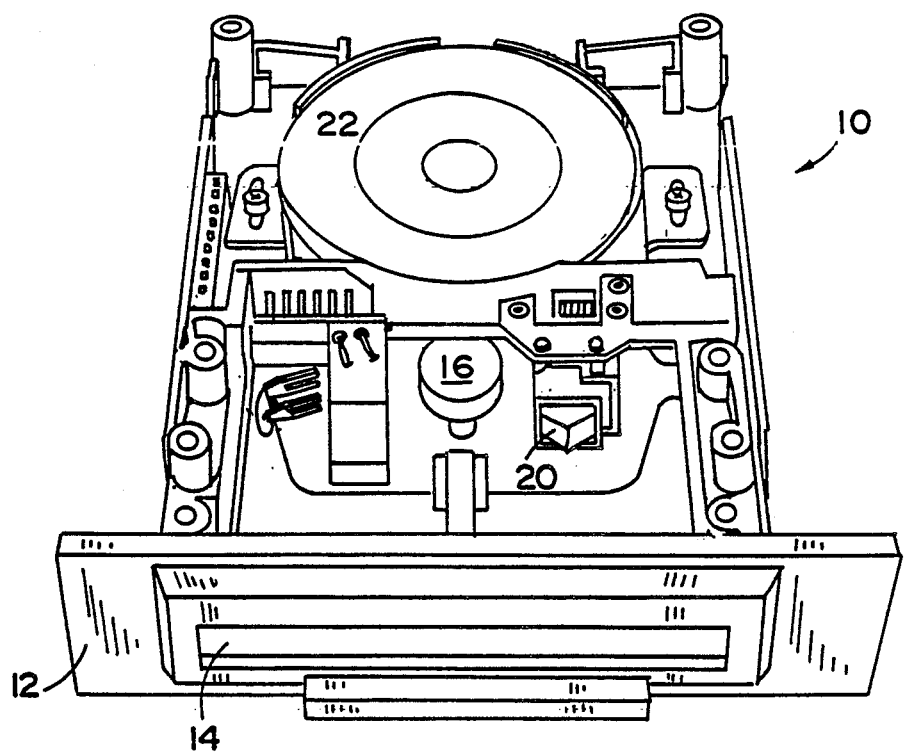
FIGS. 1, 2, 3 and 4 are views of the prior art structure shown in U.S. Pat. No. 4,647,994, and are taken directly from such patent.
Figure 2:
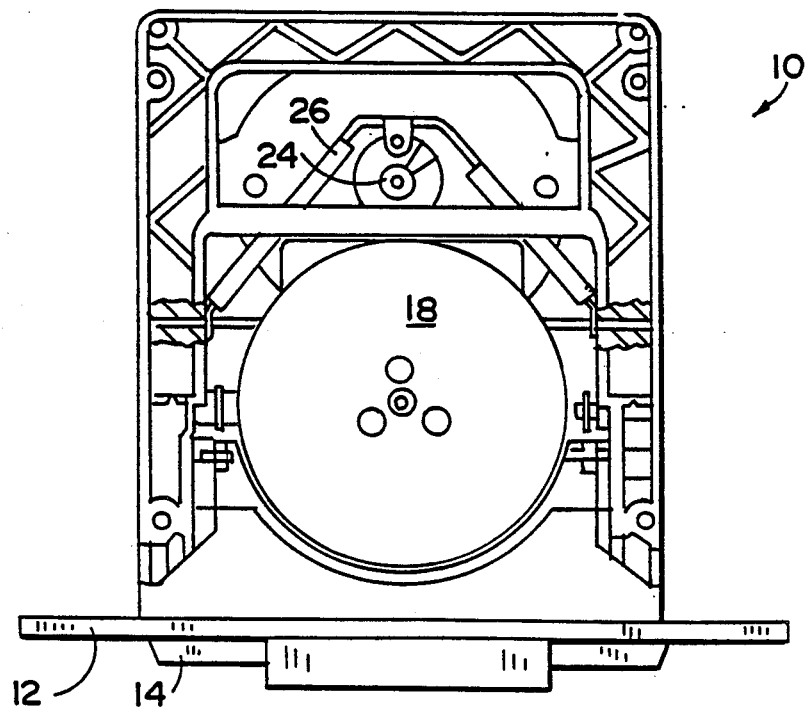
Figure 3:
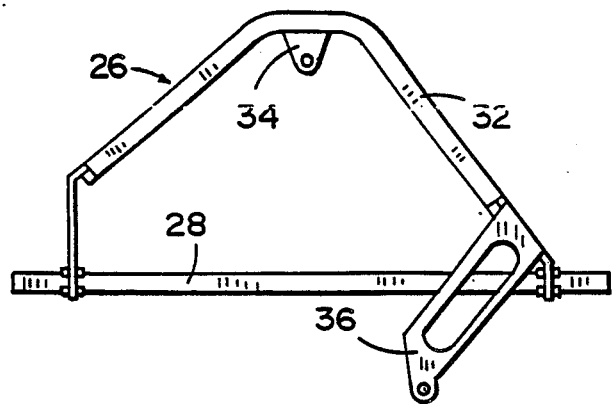
Figure 4:
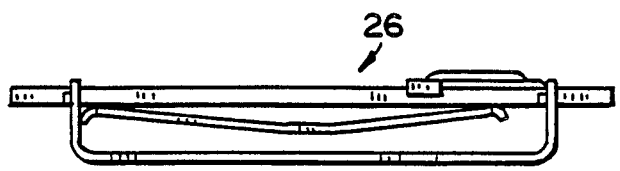

As illustrated in FIGS. 1, 2, 3 and 4, a miniaturized cartridge-type tape drive 10 in accordance with prior art technology is an extremely compact device (which in fact is made to fit the same spatial envelope used for floppy disk drives in present-day computer systems, in particular "personal computers"). Thus, the tape drive 10 includes a face plate 12 which defines a tape cartridge-admittance opening 14 and, internally, includes such major components as a capstan 16 for imparting motion to the tape, a capstan-drive motor 18, a transducer head 20 which is mounted for guided vertical movement under control of a positioning system, and a head-positioning means comprising a stepper motor 22 which drives a rotary cam 24 that, in turn, imparts motion to a pivotal positioning arm 26. For a complete description of this prior art tape drive, reference is made to U.S. Pat. No. 4,647,994, incorporated by reference herein.

As illustrated in FIGS. 1-4, inclusive, the positioner arm 26 of the prior art device was a complex structure, having a centrally-disposed rod-like pivot axle 28 which extended transversely across the full width of the support frame 30 for the tape drive, being journaled in opposite sides thereof. A generally U-shaped portion 32 of arm 26 extended rearwardly toward the rotary cam 24 and included a follower 34 which rested in contact with the face of the positioning cam 24, to impart the motion of the cam to the arm, pivoting it about axle 28. In turn, this moved a forwardly-projecting portion 36 of the positioning arm, which is coupled to the head 20 to impart corresponding positioning movements to it.

As previously indicated, the form of the tape drive 10 illustrated in FIGS. 1-4, inclusive, has proven itself to be a satisfactory device during extensive actual use heretofore; however, increasingly demanding conditions of increased track density, with narrower tracks etc., have made improvements to this apparatus desirable, particularly from the standpoint of the positioner apparatus. The present disclosure provides such improvements by way of an innovative new form of apparatus, as illustrated in FIGS. 5-11, inclusive, showing a drive 110 incorporating the new forms of apparatus but also retaining use of other portions of the previous drive 10 which continue to be as suitable as before. All such components common to FIGS. 1-4, as well as FIGS. 5-11 are identified by the same numbers for consistency.

Figure 5:
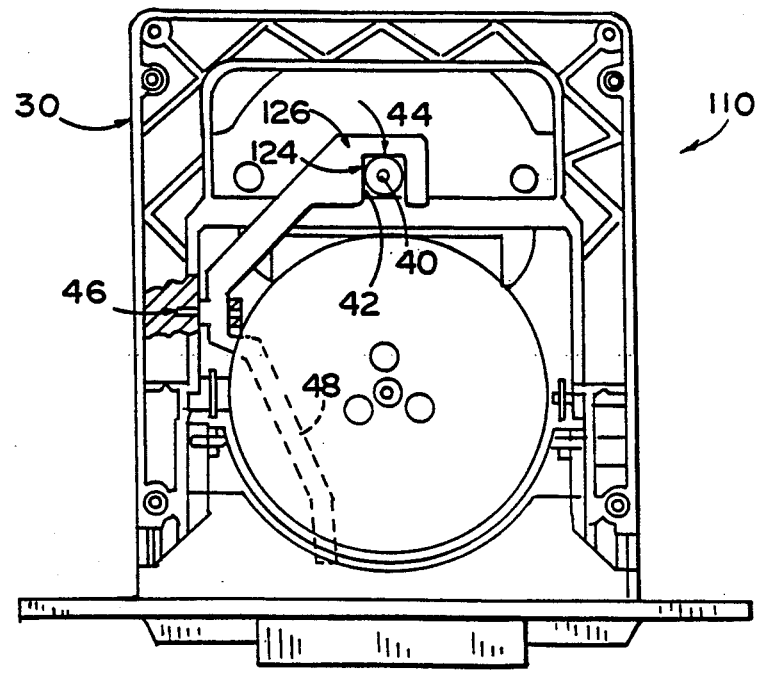
FIG. 5 is a bottom plan view similar to FIG. 2 but showing a similar tape drive embodying the new positioning apparatus of the present invention.
Figure 7:
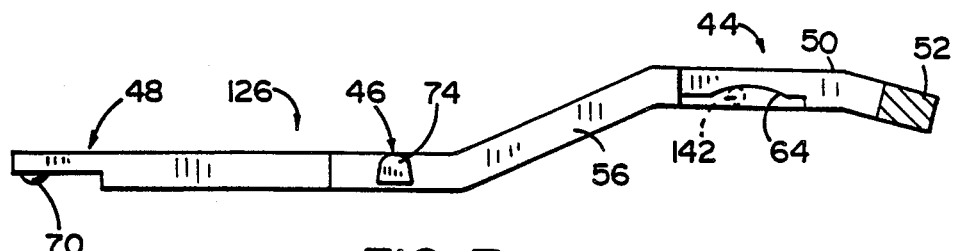
FIG. 7 is a sectional side elevation thereof, taken along the plane VII—VII of FIG. 6.

As illustrated in FIG. 5, the drive 110 includes an entirely different form of head-positioner arm 126, together with a new form of actuator 124, which in essence includes a lead screw and follower-type device forming the particular subject matter of co-pending application Ser. No. 314,454, filed Feb. 22, 1989: Insofar as the present disclosure is concerned, the positioner actuator 124 may for convenience simply be considered to include a stepper motor 22 substantially the same as that referred to previously herein, but whose output shaft is in the form of a lead screw 40 which is threadedly engaged with a follower nut 42.

As readily discernible in FIG. 5, the new form of positioner arm 126 in accordance herewith includes a three-sided portion 44 at its rearward-most extremity which fits wrench-like around the lead screw follower nut 42, to prevent rotation of the nut when the stepper motor 22 rotates lead screw 40, thereby causing nut 42 to traverse the length of lead screw 40 under such conditions, following along its threaded exterior.

As illustrated, arm 126 is of generally C-shaped overall configuration, and incorporates a pivot structure 46 medially along its length (i.e., well inward from either end extremity, but not necessarily at the center), by which the arm is pivotally mounted on one side of frame 30. Projecting forwardly of pivot structure 46 is an extending finger portion 48 whose forward-most extremity engages the apparatus which carries head 20 and provides its precisely-guided motion, in a manner such that pivotal motion of arm 126 in response to actuation by the lead screw and follower mechanism 40, 42 initiates corresponding incremental movement of head 20, so that it may be moved in a track-to-track manner across the width of the recording media (i.e., tape).

Details of the preferred structure for arm 126 are illustrated in FIGS. 6-10, inclusive, from which it will be readily apparent that arm 126 is of much simpler form than the multiple-part arm 26 used in the previous device (i.e., that shown in FIGS. 1-4), notwithstanding the fact that superior results are provided by the new structure. As previously indicated, arm 126 is of generally C-shaped configuration, with the pivot structure 46 disposed generally medially along its length and the wrench-like follower-engaging portion 44 disposed at the rearward extremity. Generally speaking, the overall dimensions and in certain respects the shape of arm 126 are dictated by the particular arrangement and positioning of parts and components in the drive 110, the principal function of the arm itself being of course predetermined. Nonetheless, the particular form of arm 126 as illustrated and described herein possesses attributes and features providing novel and unusual characteristics, as described more fully hereinafter.

As best seen in FIG. 6, the wrench-like spanner portion 44 includes an open-sided structure comprising first, second, and third orthogonally-disposed integral sections 50, 52 and 54, respectively. Of these, sections 52 and 54 are of similar form, and are laid out to extend around the outside of lead screw follower nut 42, engaging the same in close though slidable contact (e.g., on the order of 0.003 inch clearance). Section 50 in effect constitutes the end of a broad arm segment 56 which extends from the pivot structure 46 to the follower-engaging portion 44 and includes a pair of angulated sections 58 and 60, the overall arrangement serving to orient the opening 62 of the follower nut-engaging portion 44 toward and along an axis which is disposed orthogonal to that of the pivot structure 46.

An important feature of the arm 126 provided in accordance herewith, and in particular of the follower nut-engaging portion 44 thereof, is a curving recessed profile 64 provided in section 50 (FIGS. 6, 7 and 8), by which more precise positioning of the head-positioning forwardly-projecting finger portion 48 (and therefore of the transducer head itself) is achieved. More particularly, the preferred form of coupling between lead screw follower nut 42 and the nut-engaging portion 44 of arm 126 is by way of a slidable pin connection extending therebetween. In the particular embodiment under discussion, the follower nut 42 has a laterally-projecting pin 142 (FIGS. 7, 8 and 11) which engages the portion 44 of arm 126 and moves with it in a sliding manner as the lead screw follower nut 42 moves longitudinally along lead screw 40 upon actuation of stepper motor 22.

As described in prior U.S. Pat. No. 4,647,994, the forward-most end extremity of the positioner arm 26 (corresponding here to finger portion 48) engages beneath the transducer head-carrying structure to impart motion to the head upon corresponding motion of the means actuating the positioner arm. In the arrangement contemplated, such motion is in a direction opposite that of the positioner motor output device (i.e., the follower 42), due to the pivotal nature of arm 126 and the fact that both the servo motor actuator (follower nut 42) and the forward-most portion of finger 48 acting upon the transducer head-carrier are located on the same side of arm 126 (although, of course, the arrangement could just as well be otherwise). Accordingly, as stepper motor 22 rotates lead screw 40, follower nut 42 will run up and down along the length of the lead screw since the wrench-like portion 44 of arm 126 prevents rotation of follower nut 42 with respect to lead screw 40. Thus, due to the engagement of the follower nut pin 142 and portion 44 of arm 126, the arm pivots about an axis extending through pivot structure 46, with downward movement of follower nut 42 resulting in upward movement of transducer head 20. In the arrangement contemplated, like that discussed in previous U.S. Pat. No. 4,647,994, the transducer head is mounted upon a head-carrier, and the latter is preferably spring-biased downwardly against the oppositely-directed motion of pivot arm portion 48, to preclude any lost motion therebetween. Accordingly, when the stepper motor motion is in the direction opposite to that just discussed above, the energy stored in such biasing spring will force arm portion 48 back in the opposite direction, maintaining the follower-engaging portion 44 of the arm in contact with follower nut pin 142, in a uniform manner.

Figure 8:
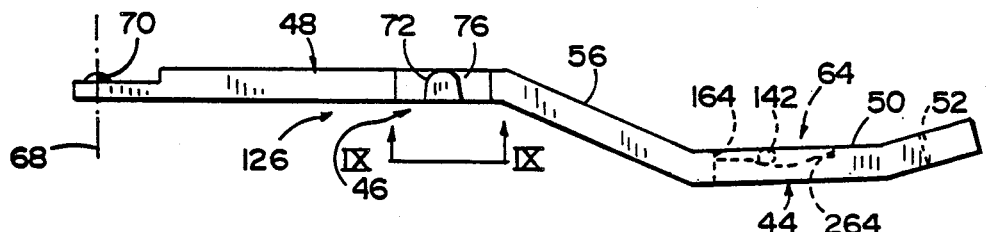
FIG. 8 is an elevational view thereof from the side opposite from that shown in FIG. 7.
Figure 11:
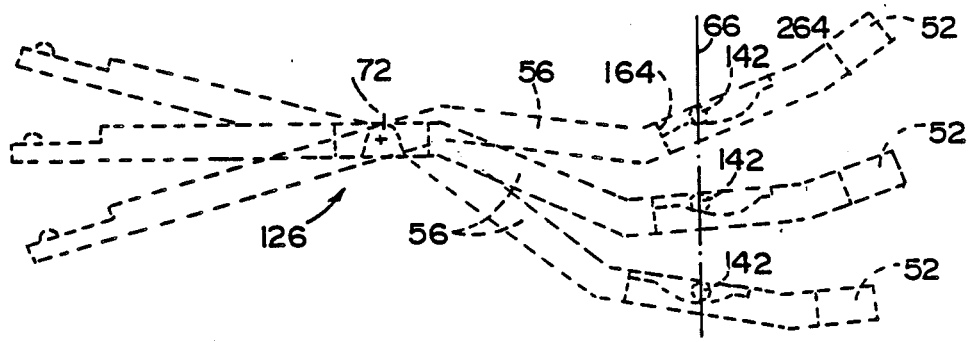
FIG. 11 is a pictorial side elevational view generally similar to FIG. 8 but showing in schematic form a sequence of different operational positions for the pivot arm which illustrate the changing position of the actuator with respect thereto.

Due to the fact that follower nut 42 moves axially along the length of lead screw 40, follower nut pin 142 moves in either of two possible directions along a linear axis 66 (FIGS. 8 and 11). Since the arm 126 undergoes pivotal motion, however, its end extremities actually move along an arcuate path. Therefore, follower nut pin 142 actually slides longitudinally along arm portion 44, in particular along the recessed profile 64 thereof. The manner in which this occurs, together with the significance of profile 64, will be more fully appreciated by referring to FIG. 11, as discussed further below. Due to the fact that the projecting head-moving portion 48 of arm 126 also moves along an arcuate (actually, circular) path, whereas the transducer head is guided along a linear axis 68 which extends parallel to axis 66, arm portion 48 also slides with respect to the head and its head-carrier. Thus, it is desirable to provide a rounded (preferably, spherical) protrusion 70 at the end of arm portion 48, which may thus slide along the head-carrier while pivoting at a constant radius.

Due to the fact that arm 126 moves pivotally, with its end extremities moving along circular paths, whereas the transducer head 20 moves along a linear path, it will be clear upon reflection that a uniform increment of motion by the lead screw follower 42 along axis 66 will result in non-uniform, and varying, degrees of motion of the transducer head along axis 68, as a function of the relative moment arms involved. While it is true that for pivot arms of very extended lengths the corresponding arcs described by its ends will approach linearity, that abstraction does not provide any practical relief for the situation encountered here, since as indicated previously the spatial envelope for the entire drive 110 is extremely limited, requiring the length of arm 126 to be comparatively short (in fact, less than about two and a half inches). Since the conditions of maximum recording track density require maximum uniformity in recording track spacing, it is highly desirable for the end extremity of head-moving finger 48 (in particular, protrusion 70 thereof) to move along its arcuate path in steps of differing length at each different segment of its movement in response to uniform increments of lead screw follower motion along axis 68 caused by uniform actuation of stepper motor 22, so that the transducer head will be moved in essentially uniform increments along axis 68.

In order to accomplish the foregoing, the curved recess 64 in portion 50 of arm 126 preferably defines a profile which is developed as a function of the required positions for follower nut pin 142 along its axis 66 for each uniformly-spaced track location (i.e., head position location). Due to the fact that arm 126 moves circularly above its pivot structure 46, such a profile may be approximated by a circle, which in effect comprises an analog (actually, anti-log) of the arc described by arm portion 48 during its pivotal head-positioning movements. Of course, in a more specific sense, the profile of curved recess 64 will actually be a compound curve since the pivot point for arm 126 is not likely to be exactly centered with respect to the recording media, and the angularity of transducer head motion with respect to the recording media will therefore be different for motion above the centerline of the media than for motion below such centerline. As will be understood, in order to provide any such curved recess profile, the follower-engaging portion 44 of the arm must either have sufficient thickness to accommodate the required depth of the curve or else it must be otherwise configured (i.e., by carrying an appropriately-shaped additional element mounted in a pivotal manner upon the arm, or by actually bending the arm itself into the desired location).

In the particular preferred embodiment illustrated, the preferred form of arm 126 constitutes a stamped member formed of sheet or plate-like stock which is of uniform thickness. In this manner, all of the structural configurations in the arm may be integrally formed, and in fact the arm itself may be made as a single, flat stamping. In this configuration, the curved profile 64 may be formed integrally in section 50 of arm portion 44, as an embossment, whose depth is precisely determined as a function of the overall shape of the arm and of the desired head-positioning. In forming curved profile 64, it is desirable to recess it below the surface of the arm material at section 50, so as to provide stepped shoulders 164, 264, at its end extremities, which serve as physical stops that will limit the maximum possible range of motion for pin 142 with respect to arm 126. Generally speaking, however, the motion of pin 142 along profile 64 (or, strictly speaking, the motion of profile 64 across pin 42) will be between the opposite end portions of the curve, as generally depicted in FIG. 11, and the curvature of the profile will compensate for the angular movement of the head-moving portion of the arm with respect to the media, which may be considered planar in form, such angular motion otherwise producing positioning errors as a function of the cosine of the angle defined by the arm at each increment of its angular motion.

The preferred structural nature of arm 126, referred to above, also enables the provision of other features and advantages in construction. One such feature involves the preferred manner of forming the pivot structure 46. More particularly, as illustrated in FIGS. 7, 8, 9 and 10, the pivot structure 46 is preferably formed integrally with the remainder of arm 126, and actually involves the provision of a pair of oppositely-directed stub axles 72 and 74 which project laterally from the main body of arm 126. In the particular configuration shown, it will be seen that stub axle 72 is located at a point spaced laterally of the main part of arm 126, being formed on the end of a projection 76, whereas stub axle 74 extends directly from the side of the arm opposite projection 76.

Generally speaking, the overall form of the arm structure involved, as illustrated for example in FIG. 6, may be formed integrally during a flat stamping process; however, the actual shape and formation of the stub axles 72 and 74 are preferably as illustrated in FIGS. 7, 8, 9 and 10; i.e., both such stub axles are preferably of generally semi-circular cross section (actually, semi-cylindrical in overall form), with stub axle 72 having its rounded section oriented upwardly with respect to the position of the arm illustrated in the Figures herein, and with stub axle 74 having its rounded section oriented in the opposite direction. With general reference to the orientation of the arm as installed within the frame 30 of the drive (FIG. 5), and the relative location and direction of force vectors generated by the positioning motor 22 and lead screw and follower mechanism 40, 42, the actual loading placed upon the pivot structure 46 during operation will thus be seen to correspond to the relative orientation of the circular sections of stub axles 72 and 74, as illustrated and just described. Accordingly, with arm 126 mounted within frame 30, and with force applied by the stepper motor and lead screw follower mechanism 124, the load applied to stub axle 72 is downwardly directed, whereas the load axle applied to stub axle 74 is upwardly directed. Therefore, the opposite half of each such stub axle need not in fact be semi-circular in cross section, and the stub axles need only be captured within D-shaped journals (D-block bearings).

The particular form of pivot structure just described lends itself very well to rapid and exact manufacture by use of coining techniques, i.e., precisely-configured stamping die shapes constituting complements of the pivot axle configurations shown and serving to form the latter by cold-flowing the material of the arm during its manufacture. It is important that the curvature of stub axles 72 and 74 be controlled very accurately, as must the specific location of these elements, since irregularities in such curvature will act as camming surfaces during pivotal movement of the arm, imparting unforeseen and undesired changes in the head-positioning movement of projecting portion 48. Thus, in order to provide accurate and consistent head-positioning operation from one drive to another, a process of manufacture of the type just described becomes extremely beneficial, since it not only is economical but produces consistently accurate results as well. On the other hand, such a process of manufacture would be extremely difficult, even to the point of impossibility, if the stub axles 72 and 74 were to be formed with a fully circular cross section.

In order to form the semi-circular stub axles in the shape illustrated, it is desirable to utilize the process and configuration illustrated in FIGS. 9 and 10, wherein stub axle 72 is illustrated. As shown there, while the upper portion of stub axle 72 is circularly rounded, the lower extremity has angularly-diverging side portions 78 and 80, and the bottom extremity defines a somewhat parabolically-shaped, elongated recess 82. Recess 82 is in fact formed by striking the underside of pivot axle 72 so as to in effect move (cold-flow) the stock of which the arm is formed outwardly into the angular sides 78 and 80 and forwardly toward the rounded section upon which pivoting is to occur. This helps drive the part toward the opposing surfaces in the tooling, thereby helping to assure that every point in the desired shape has proper location. The end result of such a process produces the accurately-shaped stub axles described above, with considerable precision and repeatability, and with substantial accompanying manufacturing economy. Preferably, a similar process is used to form the aforementioned spherical protrusion 70 at the forward end of arm portion 48, which bears upwardly against the underside of the transducer head-carrier.

Accordingly, it will be seen from the foregoing that the improvements in head-positioning apparatus provided herewith not only make available means by which superior head-positioning results may be achieved in data-storage apparatus, but additionally provide for the achievement of such improved results in a particularly effective, desirable and economical manner. By use of a positioner arm in accordance herewith, in conjunction with position-actuation means of the type disclosed (i.e., stepper motor drive and lead screw and follower actuator means), a considerable enhancement is achieved in head-positioning resolution and track-to-track positioning accuracy. That is, with such actuation means, the thread pitch on the lead screw shaft may be selected to provide a desired relationship between axial displacement of the follower nut with respect to angular rotation of the shaft by the stepper motor, whereby desirably higher ratios of motor step actuation per unit track displacement may be achieved, thereby enhancing resolution by providing greater uniformity and precision. At the same time, the novel form of coupling provided between the actuator (lead screw follower) and the transducer-positioning pivot arm results in uniform increments of head-positioning movement for each and every such increment of actuator movement, i.e., each and every step initiated by corresponding step motor excitation. Accordingly, the invention provides means by which tracks of increasingly narrow size may be uniformly spaced across the entire width of the recording media. At the same time, the particular form and structure of the positioning arm described above as a preferred embodiment may be accomplished by very desirable manufacturing processes which provide not only manufacturing economies but, more importantly, highly accurate and precise structural characteristics with high repeatability.

In the interests of particularly describing a preferred embodiment of the positioner arm in accordance herewith, it should be noted that the arm 126 may be made from "1010" mild steel by flat stamping, from stock which in the particular embodiment referred to may be approximately 0.10 inch thick. This composition, thickness, and overall structure provides a stiffness modulus on the order of 275 pounds per inch, which will resist any elastic deformation (flexure) during use that would store energy in the arm and cause corresponding errors and inaccuracies in the resultant head-positioning. At the same time, such structural specifics enable the arm to be one piece in nature and manufacturable by the disclosed stamping process, with coining of the pivot axle curvature, etc.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiment shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language specifically state otherwise. The specific structure disclosed as the preferred embodiment, in particular the coupling between the actuator (stepper motor and lead screw follower) and the positioning arm lends itself to implementation in corresponding form by way of reverse implementation, i.e., by providing the profiled slide surface on the follower nut instead of on the pivot arm, and having the pivot arm carry the engagement pin rather than incorporating that into the follower nut. Conversely, comparable structure may be implemented at the opposite end of the pivot arm, where it engages the transducer head-carrier structure. Further, once this concept is appreciated, other ways of implementing it will suggest themselves.

The embodiments of the invention in which an exclusive property or privilege is claimed are defined as follows:

1. In a positioner mechanism for information storage devices, of the type having a pivotal arm for moving a transducer from one track location to another across a record member in response to the motion of a motor-driven actuator, wherein said arm is coupled to the transducer at a location spaced from the pivot axis of the arm and undergoes arcuate motion at such location whose curvature is a function of the distance between said location and said pivot axis, the improvement comprising: means operatively associated with said arm for automatically moving it through increasingly large arcuate motion increments in response to said actuator motion as the transducer is moved across said record member from the medial portion thereof toward at least one of its sides, to compensate for the curvature of said arcuate motion by moving the transducer in substantially uniform increments of distance with respect to the width of said record member.

2. The improvement in positioners as defined in claim 1, wherein said means for moving said arm automatically moves it through said increasingly large arcuate motion increments in response to substantially uniform increments of motion by said actuator.

3. The improvement in positioners as defined in claim 2, wherein said means for moving said arm comprises a compound-motion coupling between said arm and at least one of said actuator and said transducer.

4. The improvement in positioners as defined in claim 3, wherein said compound-motion coupling includes a curved surface and a member slidable along such surface, said surface having a curvature which is a function of the arcuate motion of said arm at said location.

5. The improvement in positioners as defined in claim 4, wherein said curved surface is formed in said arm.

6. The improvement in positioners as defined in claim 1, wherein said motor-driven actuator is of a type having substantially rectilinear motion.

7. The improvement in positioners as defined in claim 6, wherein said motor-driven actuator is of a type in which the actuator undergoes substantially uniform increments of motion.

8. The improvement in positioners as defined in claim 7, wherein said motor-driven actuator includes a stepper motor driver.

9. The improvement in positioners as defined in claim 8, wherein said motor-driven actuator comprises a lead screw and follower nut mechanism, said lead screw being driven by said stepper motor.

10. The improvement in positioners as defined in claim 9, including a compound-motion coupling between said arm and at least one of said follower nut and said transducer.

11. The improvement in positioners as defined in claim 10, wherein said compound-motion coupling includes a curved surface and a member slidable along such surface, said surface having a curvature which is a function of the arcuate motion of said arm at said location.

12. The improvement in positioners as defined in claim 11, wherein said curved surface is formed in said arm.

13. In a positioner mechanism for information storage devices, of the type having a pivotal arm for moving a transducer from one track location to another across a record member in response to the motion of a motor-drive actuator, wherein said arm is coupled to the transducer at a location spaced from the pivot axis of the arm in a first direction and said actuator is coupled to said arm at another location spaced from said pivot axis in a second and generally opposite direction, an improved positioning arm comprising: an elongated generally C-shaped member having pivot means disposed generally medially along the length thereof; said member having a projecting portion at one end adapted to engage and move said transducer generally orthogonally with respect to said pivot axis and having a projecting portion at the other end adapted to engage said actuator; said pivot means including a pivot axle having at least one of a first pivot axle portion extending in a first direction generally transverse to the length of said C-shaped member and a second pivot axle portion extending in a second direction generally opposite to that of said first direction and generally transverse to the length of said member.

14. The improvement in positioners as defined in claim 13, wherein said first and second pivot axle portions have generally semicircular cross-sections.

15. The improvement in positioners as defined in claim 13, wherein said elongated generally C-shaped member comprises a one-piece stamped element made from generally rigid sheet stock.

16. The improvement in positioners as defined in claim 15, wherein said first and second pivot axle portions are integral with said one-piece element.

17. The improvement in positioners as defined in claim 16, wherein said first and second pivot axle portions comprise generally semicircular sections.

18. The improvement in positioners as defined in claim 17, wherein said pivot axle portions comprise coined surfaces on said one-piece element formed by stamping.

19. The improvement in positioners as defined in claim 13, wherein said projecting portion at said other end of said C-shaped member adapted to engage said actuator comprises means for engaging a lead screw follower nut.

20. The improvement in positioners as defined in claim 19, wherein said means for engaging a lead screw follower nut comprises at least a spanner portion defining a recess for closely receiving said nut, said spanner portion restraining rotation of said nut.

21. The improvement in positioners as defined in claim 15, wherein said sheet stock comprises mild steel and said C-shaped member has a stiffness modulus along its length perpendicular to its pivot axis which is on the order of about at least 275 pounds per inch.

22. The improvement in positioners as defined in claim 14, wherein said generally semi-circular cross-sections have their curved surfaces disposed in generally oppositely-facing directions.

23. The improvement in positioners as defined in claim 22, wherein said pivot axle portions comprise generally cylindrical stub axles.

24. The improvement in positioners as defined in claim 22, wherein said pivot means includes both said first and said second pivot axle portions.

25. The improvement in positioners as defined in claim 13, wherein said arm undergoes arcuate motion at said transducer location with a curvature which is a function of the distance between said location and said pivot axle, and further including means operatively associated with said arm for automatically moving it through increasingly large arcuate motion increments in response to said actuator motion as the transducer is moved across said record member from the medial portion thereof toward at least one of its sides, to compensate for the curvature of said arcuate motion by moving the transducer in substantially uniform increments of distance with respect to the width of said record member.

26. The improvement in positioners as defined in claim 25, wherein said means for moving said arm comprises a compound-motion coupling between said arm and at least one of said actuator and said transducer.

27. The improvement in positioners as defined in claim 26, wherein said compound-motion coupling includes a curved surface and a member slidable along such surface, said surface having a curvature which is a function of the arcuate motion of said arm at said location.

28. The improvement in positioners as defined in claim 27, wherein said curved surface is formed in said arm.

29. The improvement in positioners as defined in claim 28, wherein said motor-driven actuator is of a type having substantially rectilinear motion which undergoes substantially uniform increments of motion.

30. The improvement in positioners as defined in claim 29, wherein said motor-driven actuator includes a stepper motor driver and further comprises a lead screw and follower nut mechanism, said lead screw being driven by said stepper motor.

* * * * *